UNITED STATES PATENT OFFICE.

LUCIEN JUMAU, OF PARIS, FRANCE.

ELECTROMETALLURGICAL PROCESS FOR EXTRACTING COPPER FROM ITS ORES.

No. 883,961.   Specification of Letters Patent.   Patented April 7, 1908.

Application filed January 19, 1907. Serial No. 353,062.

*To all whom it may concern:*

Be it known that I, LUCIEN JUMAU, citizen of France, residing at Paris, in the said Republic, have invented new and useful Improvements in Electrometallurgical Processes for Extracting Copper from Its Ores, (for which a French patent of addition, No. 6,477, of July 11, 1906, has been obtained,) of which the following is a specification.

My invention relates to an improved electrolytic process for obtaining pure metallic copper from its ores, and it consists in the steps and processes herein described and claimed.

My invention is especially adapted for the economical treatment of sulfid ores, in which the sulfur dioxid produced in roasting said ores is utilized in subsequent steps of the process.

In the application of my invention to sulfid ores, the ores are subjected to a preliminary roasting to convert the copper salt into an oxid; the complete conversion of the copper into an oxid is not necessary, since the presence of a portion of copper sulfate is permissible in the operation of my invention.

The roasted ore is lixiviated by an ammoniacal solution, such as a sulfate or a sulfite of ammonium or a mixture of the two. The lixiviation is preferably performed at a raised temperature, and the copper is freely dissolved in the ammoniacal solution; 70 grams of copper being readily dissolved per liter of the solution. The solution is then subjected to the action of sulfur dioxid; this step being preferably performed by passing through the solution the sulfur dioxid produced during the preliminary roasting of the sulfid ores. It is preferable to drive off the free ammonia from the solution previous to treating it with the sulfur dioxid, and to employ such ammonia in the lixiviation of a subsequent quantity of ore.

The treatment of the ammoniacal solution with sulfur dioxid is preferably performed at a raised temperature, and the reaction may be expressed as follows:

$$3Cu(HO)_2 + 3SO_2 = CuSO_3 \cdot Cu_2SO_3 + H_2SO_4 + 2H_2O.$$

A precipitate of copper containing cuprous sulfite, such as a cuproso-cupric sulfite is thrown down and the remaining solution may be employed for lixiviating a subsequent quantity of ores by driving off the sulfur dioxid dissolved in the solution and rendering the solution ammoniacal by the addition of a suitable quantity of ammonia thereto. The ammonia necessary for this purpose can be economically obtained by employing the ammonia previously evaporated from the ammoniacal solution of copper with the addition of an extra supply of ammonia sufficient to neutralize the solution. The extra supply of ammonia can be obtained by treating with lime the ammonium sulfate with which the lixiviating solution becomes enriched; the action may be expressed as follows:

$$CaO + (NH_4)_2SO_4 = CaSO_4 + 2NH_3 + H_2O.$$

The cuproso-cupric sulfite, which is only slightly soluble in water, is dissolved in an ammoniacal solution, such as the sulfate or sulfite of ammonium.

When the cuproso-cupric sulfite is dissolved as above described in an ammoniacal solution, a resultant solution is produced containing cuprous sulfite mixed with ammonium sulfite.

In previous processes for the electrolytic deposition of metallic copper from an ammoniacal cuprous solution, it has been necessary to employ a diaphragm during the electrolysis, since the deposited copper is found to be dissolved in the ammoniacal cuprous solution, thereby rendering the process commercially expensive and wasteful; the action being expressed as follows:

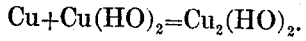

$$Cu + Cu(HO)_2 = Cu_2(HO)_2.$$

Thus cuprous hydrate is dissolved in the ammoniacal solution during the electrolytic process, and acts as a depolarizing agent; the action may be stated as follows:

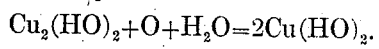

$$Cu_2(HO)_2 + O + H_2O = 2Cu(HO)_2.$$

This double transformation results in an undesirable loss of electric energy in the electrolytic deposition of copper from the solution without the employment of a diaphragm. I have found that this practical defect can be efficiently eliminated by passing carbonic acid gas through the solution to saturate the latter during the electrolysis. This step converts the ammonia of the solution into the form of a carbonate, from which the copper is readily deposited in a very satisfactory manner; the passage of the carbonic acid gas also acting mechanically to maintain a circulation of the electrolyte.

The above described employment of carbonic acid gas constitutes my preferred process, but the purpose thereof could be accomplished by employing carbonate of ammonia as the ammoniacal solution previously described for dissolving the cuprosocupric sulfite. The solution is then subjected to electrolytic action for precipitating the copper in a pure metallic form.

I have described a preferred and satisfactory process, but, obviously, changes could be made within the spirit and scope of my invention.

Having thus described my invention, what I claim as new therein and desire to secure by Letters Patent is:

1. The herein described electrolytic process for obtaining pure copper from its ores, which consists in lixiviating the ores with an ammoniacal solution, precipitating the copper from said solution in the form of a precipitate containing cuprous sulfite, dissolving said cuprous sulfite in an ammoniacal solution, and in subjecting said last solution to electrolytic action in the presence of carbonate of ammonia.

2. The herein described electrolytic process for obtaining pure copper from its ores, which consists in lixiviating the ores with an ammoniacal solution, precipitating the copper from said solution in the form of a precipitate containing cuprous sulfite, dissolving said cuprous sulfite in an ammoniacal solution, transforming said ammoniacal solution to a carbonate, and subjecting said solution to electrolytic action.

3. The herein described electrolytic process for obtaining pure copper from its ores, which consists in lixiviating the ores with an ammoniacal solution, precipitating the copper from said solution in the form of a precipitate containing cuprous sulfite, dissolving said cuprous sulfite in an ammoniacal solution, subjecting said solution to electrolytic action, and simultaneously passing a current of carbonic acid gas through said solution.

In testimony whereof I have signed my name to this specification in the presence of two subscribing witnesses.

LUCIEN JUMAU.

Witnesses:
JULES FAYOLTET,
EUGÈNE PICHON.